(12) United States Patent
Lomax, Jr. et al.

(10) Patent No.: US 8,012,423 B2
(45) Date of Patent: *Sep. 6, 2011

(54) METHOD AND APPARATUS FOR PROTECTIVE ATMOSPHERE RECYCLING

(75) Inventors: Franklin D. Lomax, Jr., Falls Church, VA (US); Richard S. Todd, Annandale, VA (US); Milan J. Skarka, Springfield, VA (US); Edward T. McCullough, Dallas, TX (US); Ronak Patel, Reisterstown, MD (US); Christopher P. Heinrichs, Falls Church, VA (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,840

(22) Filed: Nov. 4, 2010

(65) Prior Publication Data

US 2011/0041548 A1 Feb. 24, 2011

Related U.S. Application Data

(63) Continuation of application No. 11/749,521, filed on May 16, 2007, now Pat. No. 7,914,746.

(60) Provisional application No. 60/839,427, filed on Aug. 23, 2006.

(51) Int. Cl.
*B01D 50/00* (2006.01)
*B01D 46/46* (2006.01)
*B01D 47/00* (2006.01)
*F25J 3/00* (2006.01)
*C10K 25/10* (2006.01)

(52) U.S. Cl. ........ 422/168; 422/171; 422/172; 422/173; 62/632; 62/636; 95/22; 261/17; 261/DIG. 19; 55/257.1; 55/220; 96/243; 96/355

(58) Field of Classification Search ................. 422/168, 422/171–173; 62/632, 636; 95/22; 261/17, 261/DIG. 19; 55/257.1, 220; 96/243, 355
See application file for complete search history.

(56) References Cited

U.S. PATENT DOCUMENTS 1,672,778 A * 6/1928 Raffloer ..................... 422/168
(Continued)

FOREIGN PATENT DOCUMENTS

WO WO 00/10950 3/2000

OTHER PUBLICATIONS

Office Action issued Jan. 24, 2011, in Chinese Patent Application No. 200780031346.6 (with English-language translation).

*Primary Examiner* — Jill Warden
*Assistant Examiner* — Monzer R Chorbaji
(74) *Attorney, Agent, or Firm* — Alix, Yale & Ristas, LLP

(57) ABSTRACT

A recycling apparatus for spent protective atmosphere gas contaminated with fouling organic decomposition byproduct materials. The recycling apparatus includes a compressor having an inlet connected to a spent protective atmosphere gas supply line, and a solvent supply configured to supply solvent to a gas passage at or upstream of the compressor. The recycling apparatus also includes a first chamber connected to an outlet of the compressor, where the first chamber is configured to receive compressed gas from the compressor and to collect a mixture including the solvent and any contaminants entrapped or dissolved in the solvent.

44 Claims, 6 Drawing Sheets

U.S. PATENT DOCUMENTS

| | | | |
|---|---|---|---|
| 3,640,053 A * | 2/1972 | Gustavsson | 96/236 |
| 5,753,494 A | 5/1998 | Hater et al. | |
| 5,836,746 A | 11/1998 | Maruyama et al. | |
| 6,911,065 B2 | 6/2005 | Watanabe et al. | |
| 6,955,707 B2 * | 10/2005 | Ezell et al. | 95/47 |
| 7,361,316 B2 * | 4/2008 | Rao | 422/168 |
| 2005/0097819 A1 | 5/2005 | Lomax, Jr. et al. | |
| 2005/0265862 A1 | 12/2005 | Yamamoto et al. | |
| 2006/0099123 A1 | 5/2006 | Seeley et al. | |
| 2009/0022602 A1 | 1/2009 | Lomax et al. | |
| 2009/0173226 A1 | 7/2009 | Lomax et al. | |

* cited by examiner

METHOD AND APPARATUS FOR PROTECTIVE ATMOSPHERE RECYCLING

CROSS-REFERENCE TO RELATED APPLICATION

The present application is a continuation application of and claims the benefit of priority under 35 U.S.C. §120 from U.S. application Ser. No. 11/749,521, filed May 16, 2007, which claims the benefit of priority to U.S. Provisional Application No. 60/839,427, entitled "IMPROVED METHOD AND APPARATUS FOR PROTECTIVE ATMOSPHERE RECYCLING," filed Aug. 23, 2006. The entire contents of each of the above are incorporated herein by reference.

BACKGROUND OF THE INVENTION

1. Field of the Invention

The present invention relates to processing and recycling of spent protective atmosphere gas contaminated with fouling organic decomposition byproduct materials during thermal processing.

2. Discussion of the Background

Protective atmosphere gas used in heat treatment or other thermal processing has long been discarded after use in industries where the components being treated are coated or bound with organic species. Examples include batch annealing of metal coated with residual rolling oils and reduction and/or sintering of metal powders or fibers combined with organic binders. The spent atmosphere gases, usually at low pressure, have been considered too prone to formation of fouling deposits to be compressed, let-alone otherwise purified and recycled. This is true even when total impurities are extremely low.

The inventors of the present invention have discovered that these fouling tendencies usually arise from the formation of poly-cyclic aromatic hydrocarbons (PAH's) during the thermal processing step. Most compounds of this type form solid deposits at standard conditions. These solids are prone to further thermal dehydrogenation, with an eventual tendency to form a range of adherent solids referred to as "varnish," "tar," or "coke." These fouling tendencies are especially strong when gas mixtures containing these compounds are compressed, for two reasons. First, increasing the total pressure of the mixture increases the thermodynamic tendency towards solid formation during interstage cooling, as the partial pressure of the contaminants is increased. And second, the high temperatures experienced in many compression cycles can accelerate the formation of thermal decomposition products such as varnish, tar and coke. If these are formed in critical moving parts, such as compressor valves, then malfunction will be greatly accelerated.

SUMMARY OF THE INVENTION

In an effort to eliminate the above problems, the inventors have devised a method and apparatus for the recycling of spent atmosphere gases that advantageously reduce the net consumption of atmosphere gas. Thus, the present invention advantageously provides a method and apparatus to facilitate the processing of atmosphere gases contaminated with fouling organic decomposition byproduct materials.

Accordingly, the present invention advantageously provides methods of operating thermal treatment equipment employing protective atmospheres to treat materials including organic coatings or binders to avoid the formation of fouling deposits in a gas recycling apparatus.

The present invention further advantageously provides a method and apparatus for removing vaporized decomposition byproducts from spent atmosphere gas prior to compression in a gas recycle apparatus.

The present invention also advantageously provides a method and apparatus for compressing spent atmosphere gases contaminated with decomposition byproducts from organic coatings or binders that prevents the formation of fouling deposits.

In addition, the present invention advantageously provides a method and apparatus for cooling compressed, spent atmosphere gases contaminated with decomposition byproducts from organic coatings or binders without fouling.

The present invention also advantageously provides a method for recycling spent atmosphere gases contaminated with decomposition byproducts from organic coatings or binders that captures the byproduct species without exhausting them into the environment.

The present invention further advantageously provides a method and apparatus for recycling spent atmosphere gases contaminated with decomposition byproducts from organic coatings or binders that employs at least one stage of positive-displacement compression.

Additionally, the present invention advantageously provides a method and apparatus for recycling spent atmosphere gases contaminated with decomposition byproducts from organic coatings or binders that employs at least one stage of oil-lubricated positive-displacement compression.

Furthermore, the present invention advantageously provides a method and apparatus for recycling spent atmosphere gases contaminated with decomposition byproducts from organic coatings or binders that employs at least one stage of oil-lubricated positive-displacement compression, where the oil used to lubricate the mechanical running gear maintains its original lubricating properties.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
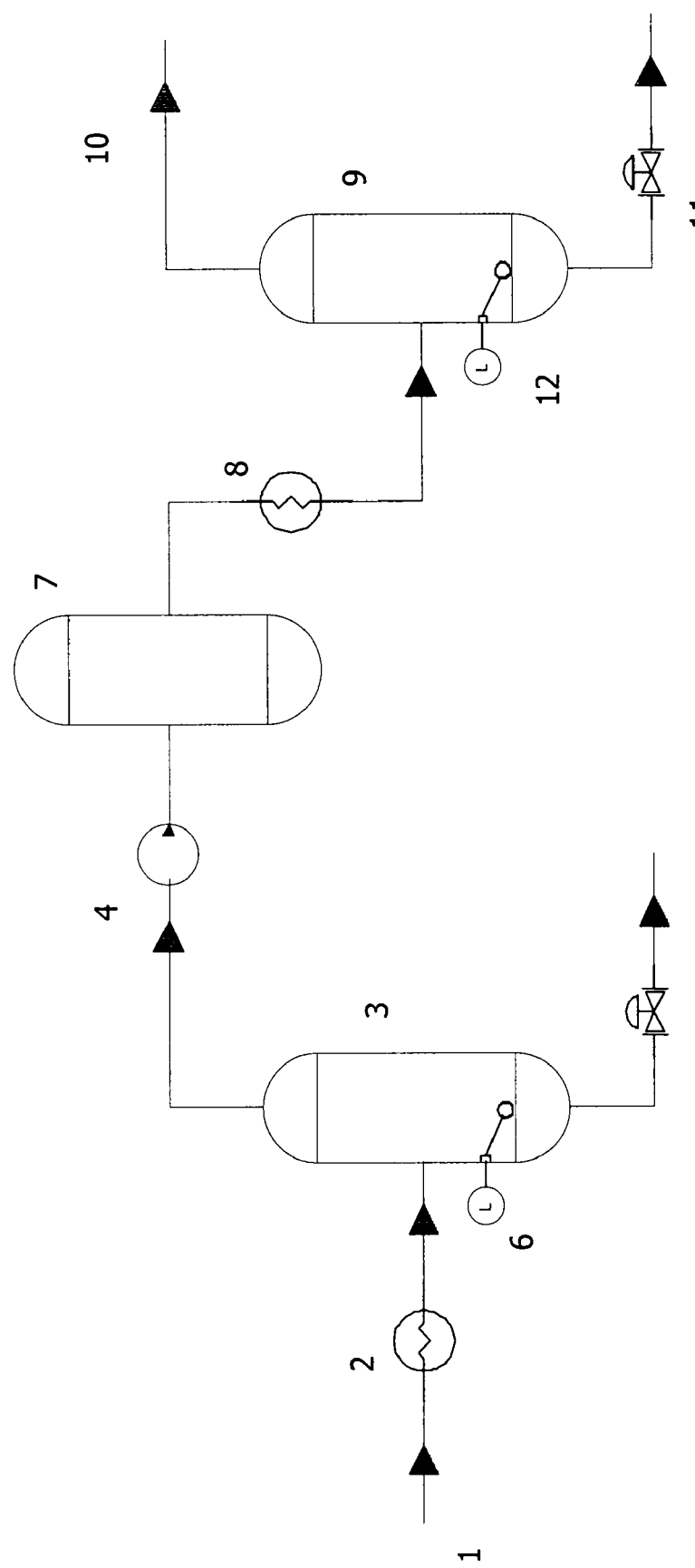
FIG. 1 depicts a schematic view of a compression system for contaminated gas.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 depicts a schematic view of a compression system that inducts a gas stream 1, which can be cooled in a heat exchanger or cooler 2 to a desired suction temperature. The cooled gas then passes to a pulsation buffering vessel or chamber 3 that minimizes fluctuations in pressure caused by suction of a gas compressor 4. The compressor 4 can be a positive displacement or dynamic compressor, using one or more reciprocating pistons, rotary screws or lobes, oscillating scrolls, a centrifugal or axial compressor, or any other type of compressor. The compressor 4 discharge is connected to a pulsation dampener or chamber 7, before entering a cooler 8, where it is cooled to a desired temperature before moving to a final vessel or chamber 9.

The compressed, cooled gas 10 exits the vessel 9 for use or for further processing. For example, the vessel 9 can serve as a pulsation dampener prior to further stages of compression, as in a multiple-stage reciprocating piston compressor. The vessel 9 can also serve as a liquid and/or solid particle separation vessel. To this end, the vessel 9 can be provided with internal baffles, filter elements, packed-media, a cyclone section, or other means to effect droplet separation. Likewise, the suction buffing vessel 3 can also serve as a separation device before the compressor 4. In order to evacuate separated material from vessels 3 and 9, they are provided with drains with drain valves 5 and 11, respectively. The drain valves can be manual valves or automated valves. The drain valves can also be actuated by level sensors 6 and 12, which can be of any level sensor type, such as radar, capacitance, thermal conductivity, ultrasonic, mechanical float, or optical, as suits the material being collected. In lieu of the level sensors 6 and 12, the drain valves 5 and 11 can be automated based on timers, on number of compressor rotations, or on other means. The method of automation does not limit the present invention in any way.

Table 1 below shows representative compositions of contaminants condensed from heat treating atmosphere gas at 0° C. All of these compounds are polyaromatic hydrocarbons, and all are solids at room temperature. These compounds, as well as other hydrocarbons, water vapor, and solids may be present in the inlet atmosphere stream 1 in concentrations in excess of 1,000 parts per million. Such concentrations can result in rapid fouling of coolers 2 and 8, which results in undesirable downtime for maintenance. Even if the concentrations, temperature, and pressure are such that fouling does not occur in heat exchanger 2 or vessel 3, the higher total gas pressure in heat exchanger 8 and vessel 9 could result in the formation of fouling deposits. Likewise, if the product gas 10 is compressed in subsequent stages of compression, as may be desirable to affect the best purification of the gas, then subsequent stages may experience fouling.

Figure 2:
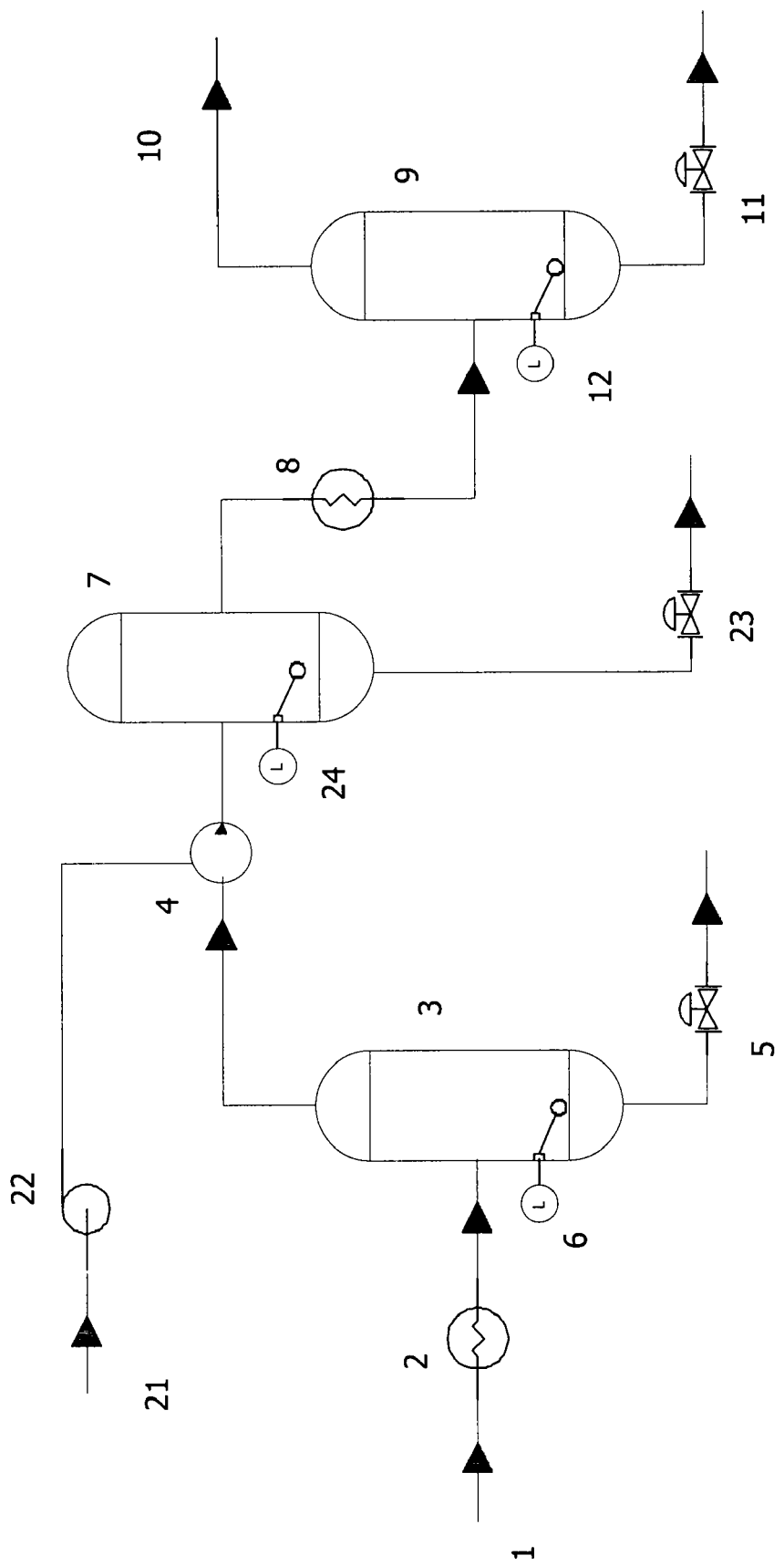
FIG. 2 depicts a schematic view of a compression system with compressor lubrication according to the present invention.

FIG. 2 shows an alternative compression scheme according to the present invention, wherein the compressor 4 is provided with a supply of solvent 21, which in this case is lubricant, via a pump 22. Because a liquid mixture can now collect in the discharge pulsation dampener vessel 7, the vessel 7 is provided with a drain with a drain valve 23. The drain valve 23 can be manually actuated or automatically actuated (e.g. by use of a level switch 24, or by other means), as described above. The addition of lubricant 21 advantageously serves to enhance the sealing and wear life of the compressor 4.

The inventors have determined that the chemical composition and addition rate of the lubricant 21 can advantageously be selected in order to segregate the contaminants in the feedstock stream 1 into a liquid mixture of the solvent and any contaminants entrapped or dissolved in the solvent, which can be collected in chambers 7 and 9 and discharged via the valves 23 and 11, respectively. The lubricant can be the same lubricant used to lubricate the compressor 4 itself. Because dissolved hydrocarbon, water and solid contaminants could alter the properties of the lubricant, it is preferred that a lubricant supply is employed that is separate from the lubricant supply for the mechanical components of the compressor. The use of a separate oil supply in compressors, especially positive displacement compressors, is widely practiced. For example, rotary vane, rotary screw, oscillating scroll, rotary lobe and reciprocating piston compressors are all known to be operated with one lubricant supply for the gas passages and a second supply for the mechanical apparatus.

Figure 3:
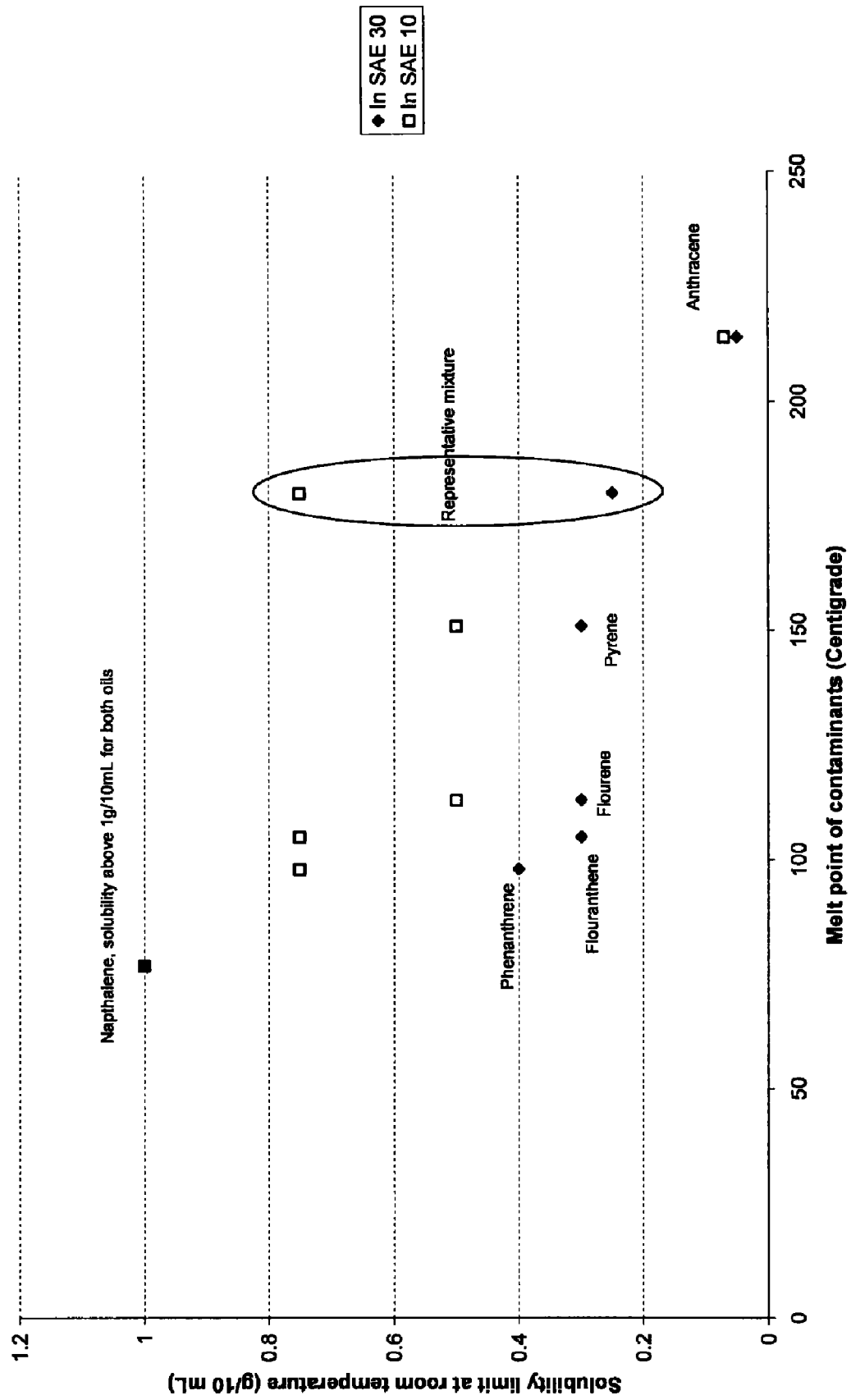
FIG. 3 is a chart showing solubility limits of hydrocarbon contaminants in two different compressor lubricants at room temperature.

FIG. 3 shows the limits of solubility of representative contaminant hydrocarbons in two different compressor lubricants at room temperature. The lower melting point contaminants such as naphthalene have higher solubility limits in room temperature lubricant that the higher ones. Further, in this example, the lower viscosity lubricant advantageously dissolved a greater proportion of contaminants. Because different gas streams may carry different contaminants, it is not possible to identify a preferred lubricant for all cases; however, it is clearly important to establish the solubility limits to ensure that the lubricant chosen has an adequate ability to dissolve the contaminants in question at the temperatures of interest. All of the contaminants illustrated in FIG. 3 dissolved completely in both lubricants at 100° C. at the 1 g/10 mL concentration level. Therefore, the local prevention of fouling within the compression system according to the present invention can be affected by the relative amounts of lubricant and contaminant flow, the temperature of the lubricant and contaminant mixture, the local concentration of the contaminant, and the chemical composition of the lubricant.

Figure 4:
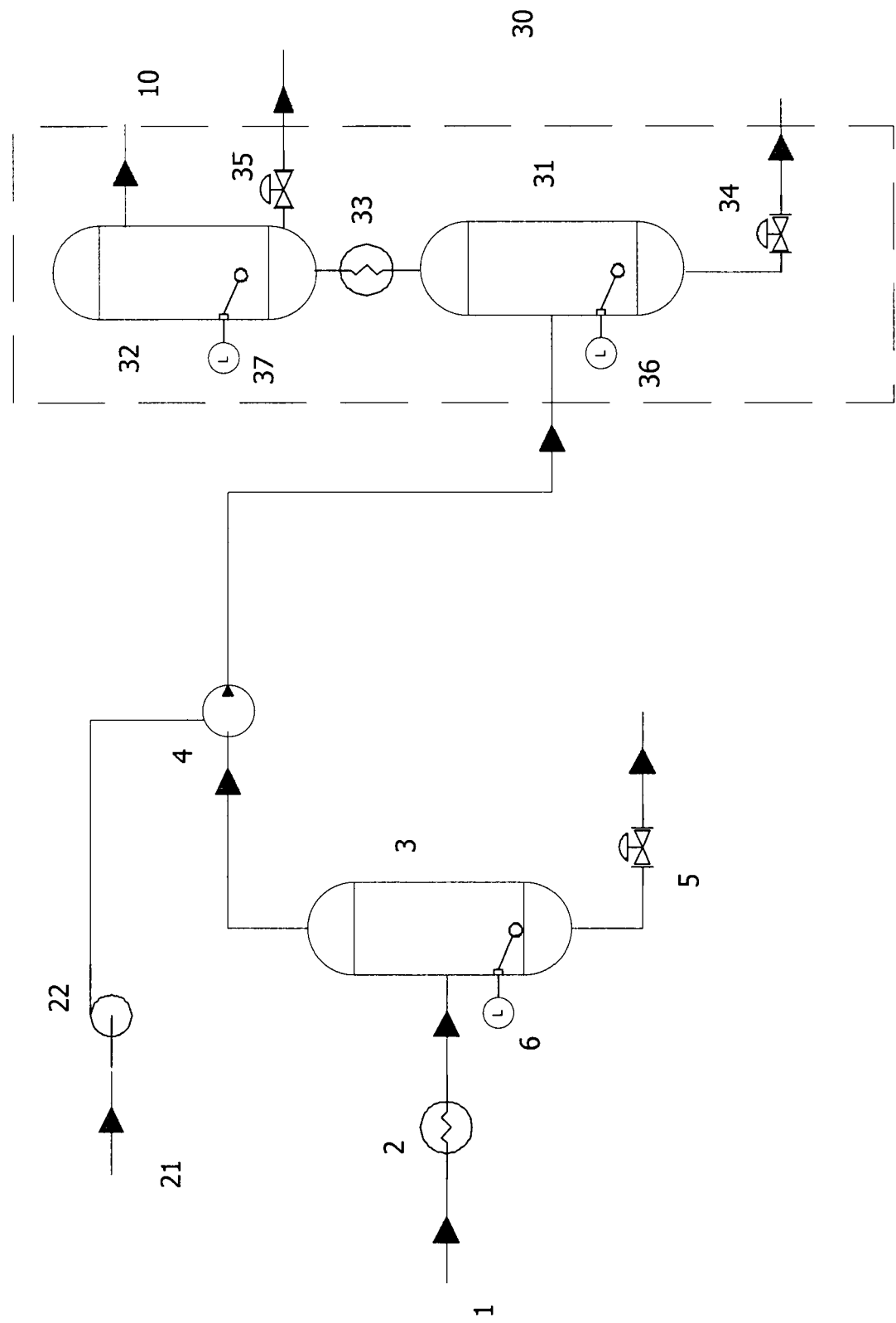
FIG. 4 depicts a schematic view of a compression system according to the present invention with a gas buffer placed below a gas cooler.

FIG. 4 illustrates another embodiment of the compression system of the present invention where the compressor discharge buffer 7 of FIGS. 1 and 2 is replaced by a lower buffer chamber 31. The lower buffer chamber 31 is placed partially

TABLE 1

| | Amount detected (in µg) for an injection of 1.0 µl of sample | | | | | | | | | |
|---|---|---|---|---|---|---|---|---|---|---|
| Sample # | Naphthalene | Acenaphthylene | Acenaphthene | Fluorene | Anthracene/Phenanthrene | Fluoranthene | Pyrene | Chrysene/Benz[a]Anthracene | Benzofluoranthenes | Benzo[a[pyrene |
| 1 | 0.289 | 0.016 | 0.010 | 0.096 | 0.439 | 0.200 | 0.174 | 0.008 | 0.010 | — |
| 2 | 0.037 | — | 0.027 | 0.028 | 0.054 | — | 0.003 | — | — | — |
| 3 | 11.24 | 0.873 | 0.171 | 0.837 | 2.264 | 0.508 | 0.329 | 0.128 | 0.034 | 0.030 |
| 4 | 7.271 | 0.424 | 0.148 | 0.453 | 0.537 | 0.128 | 0.105 | 0.006 | — | — |
| 5 | 0.060 | — | — | 1.805 | 0.802 | 0.197 | 0.089 | — | — | — |
| 6 | — | — | — | 1.017 | 3.040 | 0.520 | 0.238 | 0.074 | — | — |
| 7 | — | — | 0.024 | 2.596 | 1.133 | 0.190 | 0.108 | — | — | — | or wholly below the cooler 33, which is arranged so that condensing liquid is drained into the buffer 31 chamber. The cooler 33 is connected with an upper buffer chamber 32, which is partially or wholly above buffer chamber 31 and is in fluid communication with the discharge of cooler 33. In this embodiment, compounds having a lower saturation temperature than that otherwise present in the compressor 4 discharge continually drain, or reflux, into the lower buffer chamber 31. This materially reduces the temperature in the buffer chamber 31, but also results in continual cleaning of solid deposits from the surfaces of the cooler 33 and the buffer chamber 31. This results in a lower overall concentration of high saturation temperature compounds in the liquid mixture collected in the buffer chamber 31 to be drained through a drain with a drain valve 34, which can be actuated by level sensor 36, or other means. Although it is conceivable under some circumstances that no liquid would accumulate in the upper buffer chamber 32, provision for liquid accumulation and removal can be provided via a drain with a drain valve 35 and level sensor 37. As shown in FIG. 4, the functional elements of this embodiment can be combined into a single mechanical assembly 30. Alternatively, the apparatus can be constructed in plural subassemblies.

Figure 5:
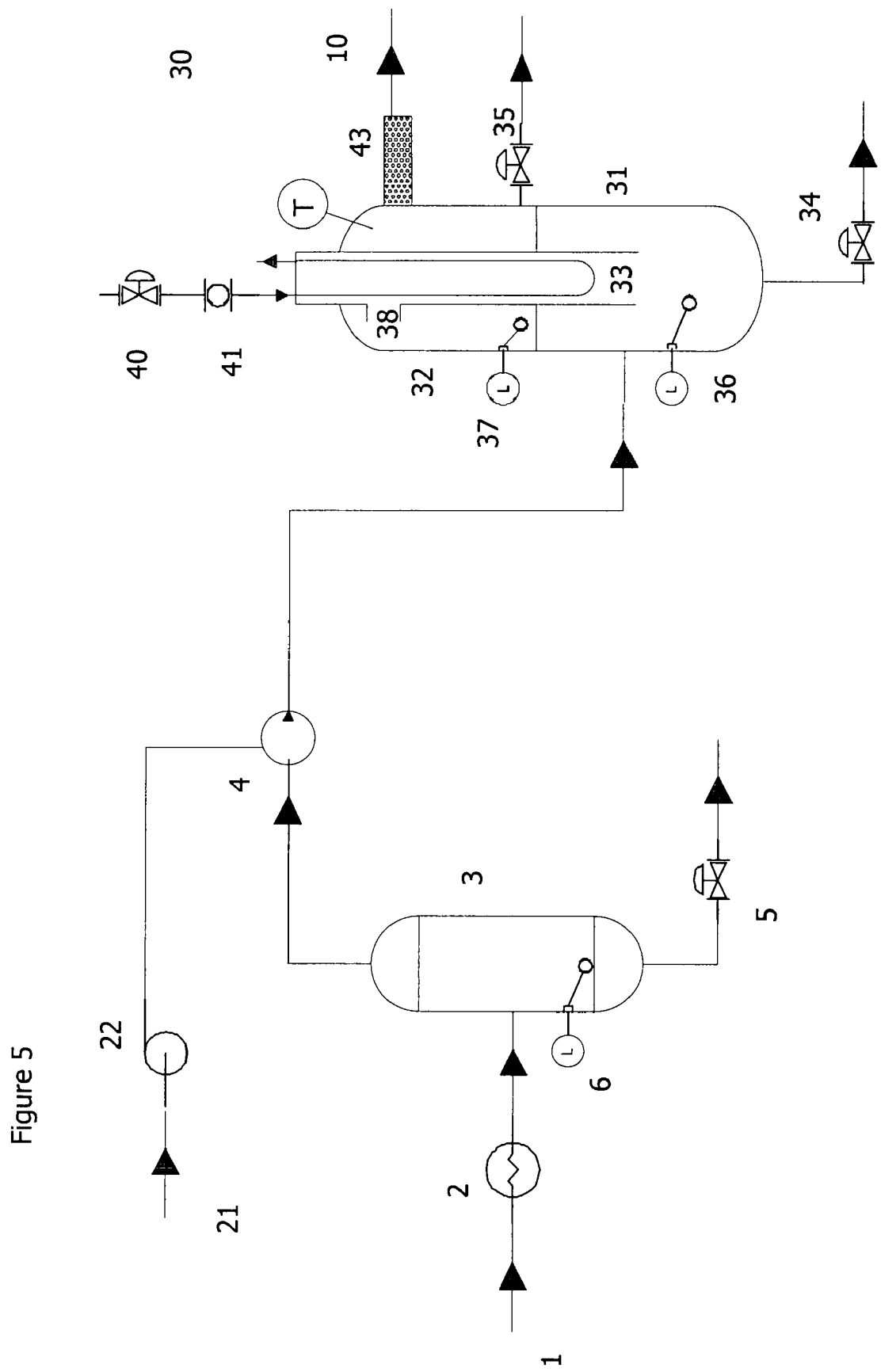
FIG. 5 depicts a schematic view of a compression system according to the present invention with a unitized gas buffer apparatus.

FIG. 5 shows an alternative embodiment of the system in FIG. 4 where the buffer assembly 30 is a single apparatus. In this embodiment, the cooler 33 is provided with a tube that has an inlet in fluid communication with the lower buffer chamber 31 and a discharge 38 that is in fluid communication with the upper buffer chamber 32. In this embodiment, the cooler 33 is a removable, U-tube bundle type cooler with a cooling fluid admitted through valve 40, and passing through flow indicator 41. The temperature of the gas 10 discharged from the upper chamber 32 can be advantageously used to control the flowrate through the valve 40. This control can be done manually or automatically, via an electronic controller, or via a mechanical controller, such as a thermostatic valve. The buffer assembly 30 is advantageously provided with a droplet coalescing means 43 to prevent the carryover of liquid or solid contaminants in the gas stream 10. The droplet coalescing can be accomplished via a packed bed, cartridge filter, or other means known to one skilled in the art. Although the upper and lower chambers 32 and 31 are shown as having the same diameter in FIG. 5, these chambers can be provided with different diameters. Furthermore, these chambers can alternatively each be provided with separate pressure boundaries, whereas FIG. 5 illustrates a single, shared pressure boundary separating the chambers.

Figure 6:
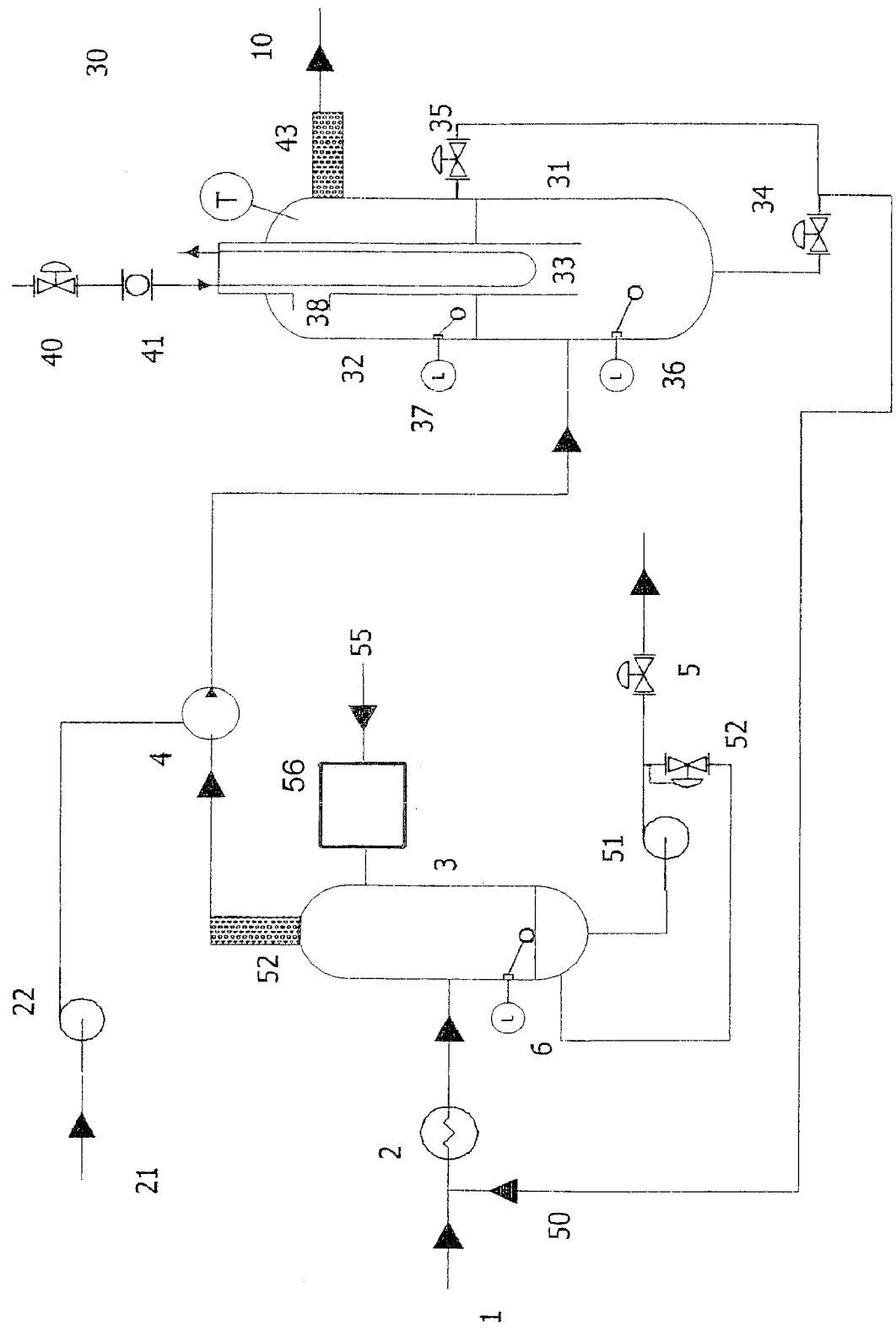
FIG. 6 depicts a schematic view of a compression system according to the present invention with a unitized gas buffer apparatus with recycle of waste liquids to the system inlet, solvent injection means, and waste liquid pumping means.

The previous figures illustrate embodiments of the present invention that are useful when the feedgas 1 is not contaminated with species that form fouling deposits at the pressure and temperature existing in cooler 2. FIG. 6 shows an embodiment of the present invention that is advantageous for situations where fouling in cooler 2 or in inlet buffer vessel 3 is possible. In this embodiment, the mixture of condensed lubricant and contaminant streams from valves 34 and 35 are supplied to the vessel 3, for example, the mixture can be returned to the inlet of the cooler 2 at point 50 (as depicted in FIG. 6) which then travels to the vessel 3, or alternatively the mixture can be returned to the vessel 3 directly, to the pipework conveying the gas 1 to the vessel 3 at a location upstream of the vessel 3 (either upstream or downstream of the cooler 2, if such a cooler is present), or even to the pipework at a location downstream of vessel 3 such that gravity is then used to feed the mixture to the vessel 3. Because the liquids from valves 34 and 35 are mixed with the lubricant, they have a lower molecular weight, saturation temperature, and melting point than the components that would form deposits at the low temperatures and pressures characteristic of cooler 2 and vessel 3. Thus, these liquids can be used to dissolve the deposits. If additional stages of compression are provided for gas 10 as contemplated in the present invention, the liquids captured in buffer assemblies 30 associated with those additional stages of compression could also be returned to location 50. These liquids would be successively lower in molecular weight than the liquids from valves 35 and 34. In the limit of many stages of compression, the returned liquids would be essentially only lubricant.

In order to provide for disposal of the mixture liquid from vessel 3 in a distant tank, or in situation where the gas pressure in vessel 3 is insufficient to effect flow through valve 5, it can be advantageous to provide a pump 51. The pump 51 could be provided with a back pressure valve 52 to facilitate continuous operation to prevent cooling and solidification of the mixture liquid in the pump 51. The valve 5 would still be used to remove liquid from the system, and could still be actuated by the level sensor 6, as shown.

If the recycling of mixture from the valves 34 and 35 is not desired, or if the mixture is still difficult to handle or causes fouling, a port 55 in the vessel 3 can be used for the injection of solvent. Such solvent injection could also be practiced at an injection point that is upstream of cooler 2. The use of a solvent facilitates handling of contaminants at concentrations otherwise too high for dilution in the compressor lubricant, or to economize on the use of compressor lubricant. Alternatively, solvent injection could be used in lieu of compressor lubrication. For dissolving hydrocarbon contaminants such as those in Table 1, solvents such as alcohols, ethers, light hydrocarbons, di-methyl chloride, gasoline and diesel may all serve as solvents. The inventors anticipate that other impurities can be readily dissolved in other solvents. The use of any solvent useful for dissolving the contaminants present is contemplated by the present invention. In one embodiment of the present invention, a coalescing means 56 is provided downstream of the solvent injection point 55 but in fluid communication with vessel 3, such that the condensed liquid can drain into vessel 3. This advantageously provides intimate contact between the gas 1 and the solvent injected through point 55, thus maximizing the removal of contaminants.

In a further embodiment of the present invention, the cooler 2 can be a direct-contact cooler. For hydrocarbon contaminants, a direct contact cooler using a cooling medium in which the contaminants have minimal solubility is preferred. An example of such a cooling medium is water. When a direct contact water cooler 2 is used, the immiscible hydrocarbon contaminants can be readily separated, and the coolant can be recycled indefinitely. The direct contact cooler 2 can be used with recycled lubricant being injected at point 50, with lubricant reinjection directly into inlet vessel 3, or without lubricant recycle. Different gas compositions, pressures and temperatures can make any of these routes desirable, such that none is inherently preferable.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A recycling apparatus for spent protective atmosphere gas contaminated with fouling organic decomposition byproduct materials, said recycling apparatus comprising:
   a compressor having an inlet connected to a spent protective atmosphere gas supply line;
   a solvent supply configured to supply solvent to a gas passage at or upstream of said compressor;
   a first chamber connected to an outlet of said compressor, said first chamber being configured to receive compressed gas from said compressor and to collect a mixture including the solvent and any contaminants entrapped or dissolved in the solvent and an additional chamber provided upstream of said compressor and having an inlet connected to the spent protective atmosphere gas supply line; wherein said first chamber includes a drain with a drain valve configured to discharge the mixture from said first chamber, and said drain is configured to supply the discharged mixture to said additional chamber.

2. The recycling apparatus according to claim 1, wherein said first chamber includes a drain with a drain valve configured to discharge the mixture from said first chamber.

3. The recycling apparatus according to claim 1, wherein said solvent supply is configured to supply lubricant as the solvent to said gas passage at or upstream of said compressor.

4. The recycling apparatus according to claim 3, further comprising a mechanical lubricant supply configured to supply lubricant to mechanical components of said compressor, wherein said mechanical lubricant supply is separate from said solvent supply.

5. The recycling apparatus according to claim 1, further comprising:
   a second chamber connected to an outlet of said first chamber, said second chamber being configured to receive compressed gas from said compressor and to collect the mixture including the solvent and any contaminants entrapped or dissolved in the solvent; and
   a heat exchanger provided along a conduit connecting said second chamber to said first chamber, said heat exchanger being configured to cool the compressed gas within said conduit.

6. The recycling apparatus according to claim 5, wherein said second chamber includes a drain with a drain valve configured to discharge the mixture from said second chamber.

7. The recycling apparatus according to claim 5, wherein said first chamber is provided at an operational elevation that is partially or completely below said heat exchanger, wherein any liquid condensed within said heat exchanger can drain into said first chamber.

8. The recycling apparatus according to claim 7, wherein said second chamber is provided at an operational elevation that is partially or completely above said first chamber.

9. The recycling apparatus according to claim 8, wherein said first chamber, said heat exchanger, and said second chamber are provided within a single housing assembly.

10. The recycling apparatus according to claim 8, wherein said first chamber, said heat exchanger, and said second chamber are integrated into a single apparatus.

11. The recycling apparatus according to claim 10, wherein:
    said single apparatus includes:
       a vessel having a lower chamber defining said first chamber and an upper chamber defining said second chamber, and
       a flow tube having a first opening in fluid communication with said lower chamber and a second opening in fluid communication with said upper chamber; and
    said heat exchanger extends within said flow tube.

12. The recycling apparatus according to claim 5, further comprising a third chamber provided upstream of said compressor and having an inlet connected to the spent protective atmosphere gas supply line,
    wherein said first chamber includes a drain with a drain valve configured to discharge the mixture from said first chamber, and
    wherein said drain is configured to supply the discharged mixture to said third chamber.

13. The recycling apparatus according to claim 12, further comprising a cooler provided along a conduit connecting the spent protective atmosphere gas supply line to said inlet of said third chamber, said cooler being configured to cool the spent protective atmosphere gas within said conduit.

14. The recycling apparatus according to claim 13, wherein said drain is configured to supply the discharged mixture to a gas passage of said cooler.

15. The recycling apparatus according to claim 12, wherein said drain is configured to supply the discharged mixture directly into said third chamber.

16. The recycling apparatus according to claim 12, wherein said drain is configured to supply the discharged mixture into a gas passage that is upstream or downstream of said third chamber.

17. The recycling apparatus according to claim 12, wherein:
    said second chamber includes an additional drain with an additional drain valve configured to discharge the mixture from said second chamber, and
    said additional drain is configured to supply the discharged mixture to said third chamber.

18. The recycling apparatus according to claim 17, further comprising a cooler provided along a conduit connecting the spent protective atmosphere gas supply line to said inlet of said third chamber, said cooler being configured to cool the spent protective atmosphere gas within said conduit,
    wherein said drain and said additional drain are configured to supply the discharged mixture to a gas passage of said cooler.

19. The recycling apparatus according to claim 1, further comprising a cooler provided along a conduit connecting the spent protective atmosphere gas supply line to said inlet of said additional chamber, said cooler being configured to cool the spent protective atmosphere gas within said conduit.

20. The recycling apparatus according to claim 1, further comprising a second solvent supply configured to supply a second solvent to said additional chamber.

21. The recycling apparatus according to claim 1, wherein said drain is configured to supply the discharged mixture directly into said additional chamber.

22. The recycling apparatus according to claim 1, wherein said drain is configured to supply the discharged mixture into a gas passage that is upstream or downstream of said additional chamber.

23. A method of recycling spent protective atmosphere gas contaminated with fouling organic decomposition byproduct materials, said method comprising:
    receiving spent protective atmosphere gas;
    supplying a solvent to a gas passage carrying the spent protective atmosphere gas;
    compressing the spent protective atmosphere gas at a location at or downstream of the supplying of the solvent to the gas passage;

receiving the compressed gas within a first chamber and collecting in the first chamber a mixture including the solvent and any contaminants entrapped or dissolved in the solvent receiving the spent protective atmosphere gas within and additional chamber provided at a location upstream of the compressing thereof; supplying the mixture collected in the first chamber to the additional chamber; and collecting the mixture including the solvent and any contaminants entrapped or dissolved in the solvent within the additional chamber.

24. The method according to claim 23, wherein the solvent is compressor lubricant.

25. The method according to claim 24, further comprising supplying mechanical lubricant to mechanical components of said compressor, wherein the mechanical lubricant supply is separate from the solvent supply.

26. The method according to claim 23, further comprising:
cooling the compressed gas using a heat exchanger; and
receiving the cooled, compressed gas within a second chamber and collecting in the second chamber a mixture including the solvent and any contaminants entrapped or dissolved in the solvent.

27. The method according to claim 26, wherein the first chamber is provided at an operational elevation that is partially or completely below the heat exchanger, wherein any liquid condensed within the heat exchanger can drain into the first chamber.

28. The method according to claim 27, wherein the second chamber is provided at an operational elevation that is partially or completely above the first chamber.

29. The method according to claim 28, wherein the first chamber, the heat exchanger, and the second chamber are provided within a single housing assembly.

30. The method according to claim 28, wherein the first chamber, the heat exchanger, and the second chamber are integrated into a single apparatus.

31. The method according to claim 30, wherein:
the single apparatus includes:
a vessel having a lower chamber defining the first chamber and an upper chamber defining the second chamber, and
a flow tube having a first opening in fluid communication with the lower chamber and a second opening in fluid communication with the upper chamber; and
wherein the heat exchanger extends within the flow tube.

32. The method according to claim 26, further comprising:
receiving the spent protective atmosphere gas within a third chamber provided at a location upstream of the compressing thereof;
supplying the mixture collected in the first chamber to the third chamber; and
collecting the mixture including the solvent and any contaminants entrapped or dissolved in the solvent within the third chamber.

33. The method according to claim 32, further comprising cooling the spent protective atmosphere gas upstream of the third chamber using a cooler.

34. The method according to claim 33, wherein the mixture collected in the first chamber is supplied to a gas passage of the cooler.

35. The method according to claim 32, wherein the mixture collected in the first chamber is supplied directly into the third chamber.

36. The method according to claim 32, wherein the mixture collected in the first chamber is supplied into a gas passage that is upstream or downstream of the third chamber.

37. The method according to claim 32, further comprising supplying the mixture collected in the second chamber to the third chamber.

38. The method according to claim 37, further comprising cooling the spent protective atmosphere gas upstream of the third chamber using a cooler,
wherein the mixture collected in the first chamber and the mixture collected in the second chamber are supplied to a gas passage of the cooler.

39. The method according to claim 23, further comprising cooling the spent protective atmosphere gas upstream of the additional chamber using a cooler.

40. The method according to claim 23, further comprising:
supplying a second solvent to the additional chamber; and
collecting a mixture including the second solvent and any contaminants entrapped or dissolved in the second solvent within the additional chamber.

41. The method according to claim 23, wherein the mixture collected in the first chamber is supplied directly into the additional chamber.

42. The method according to claim 23, wherein the mixture collected in the first chamber is supplied into a gas passage that is upstream or downstream of the additional chamber.

43. The method according to claim 23, wherein the compressing includes at least one stage of positive-displacement compression.

44. The method according to claim 23, wherein the compressing includes at least one stage of oil-lubricated positive-displacement compression.

* * * * *